United States Patent [19]
Glas

[11] 3,759,118
[45] Sept. 18, 1973

[54] CIRCULAR SAW GRINDING ATTACHMENT

[76] Inventor: Dirk Glas, 4976 Rumble St., Burnaby, B. C., Canada

[22] Filed: Aug. 9, 1971

[21] Appl. No.: 93,118

[52] U.S. Cl. .................................................. 76/43
[51] Int. Cl. ........................................... B23d 63/12
[58] Field of Search ................. 76/43, 37; 51/241 R, 51/247; 83/471.2, 471.3, 471.1, 477.2

[56] References Cited
UNITED STATES PATENTS

| | | | |
|---|---|---|---|
| 2,826,100 | 3/1958 | Denny | 76/43 |
| 2,742,799 | 4/1956 | Oller | 76/43 |
| 2,646,697 | 7/1953 | Phillips et al. | 76/43 |

Primary Examiner—Leonidas Vlachos
Attorney—Kellard A. Carter

[57] ABSTRACT

An attachment is provided for sharpening a blade of a bench saw or a radial arm saw when such a blade is removed from the driven arbor of the saw and is temporarily replaced by a grinding wheel. The attachment has a base and a guide which respectively engage and enter the work table top of the saw and the miter groove formed in the table with a shaft normal to the miter groove interconnecting the base and guide. A plate is mounted on the base so that the plate can be rocked to selected positions about the longitudinal axis of the shaft and about a horizontal axis disposed at right angles to said shaft axis. Securing means is provided to fasten the saw blade to the top of the plate so that the blade can be rotated progressively during the sharpening operation. The plate is fitted with stop means which engage the teeth of the saw blade as it is progressively rotated whereby to properly align other teeth with the grinding wheel.

7 Claims, 3 Drawing Figures

PATENTED SEP 18 1973 3,759,118
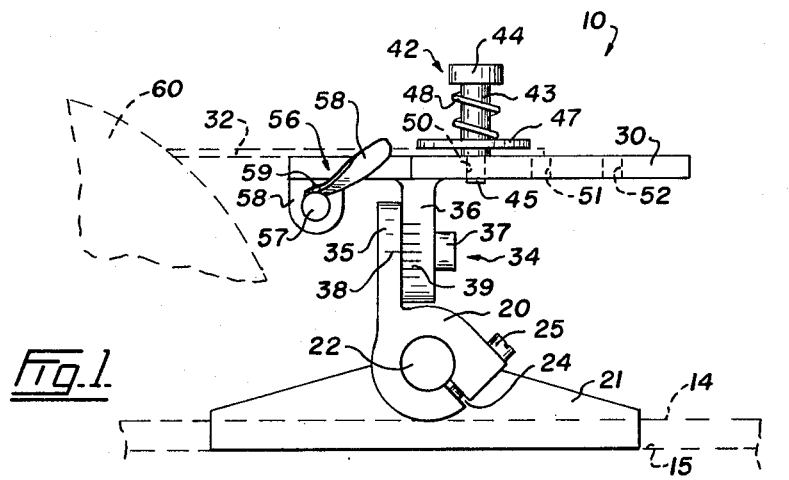
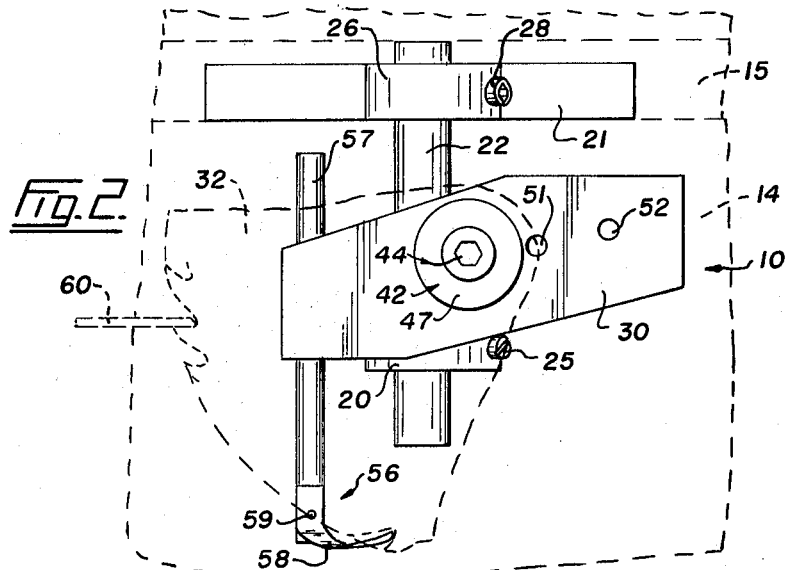
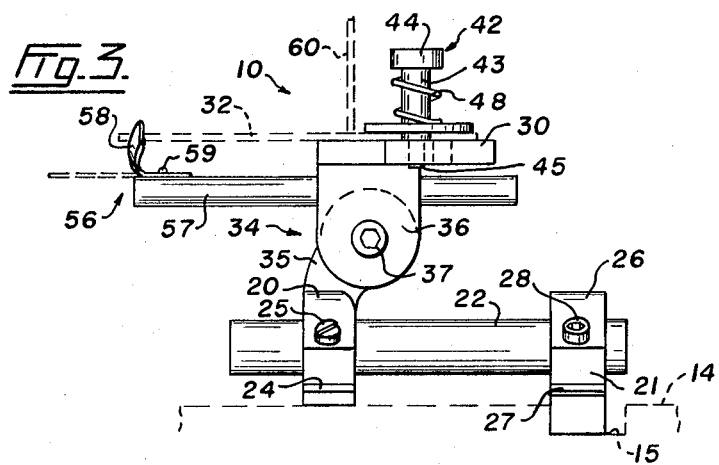

CIRCULAR SAW GRINDING ATTACHMENT

It is a common practice for the owners of bench and radial arm saws to have their circular saws, molding heads and other cutting tools sharpened by means of a special sharpening service. Normally this requires that the dulled tool be removed from the machine and transported to the area providing the sharpening surface. This is time consuming, relatively costly, and inconvenient especially when the saw is being operated at a remote building site where no saw sharpening service is readily available.

The present invention solves the problem of sharpening circular saw blades by providing an attachment which can be used on the machine equipped with the blade which requires sharpening. The attachment properly supports the blade at selected angles relative to the grinding wheel and allows the blade to be rotated one tooth at a time as each tooth in turn is sharpened. Furthermore, the attachment can be slidably mounted on the work table of a bench saw or fixedly mounted on a work table of a radial arm saw whereby the blade of either saw can be sharpened quickly, easily and accurately.

In drawings which illustrate a preferred embodiment of the invention,

FIG. 1 is a side elevation of a circular saw grinding attachment in accordance with the present invention, FIG. 2 is a plan view of the attachment, and FIG. 3 is a front elevation of the attachment.

Referring to the drawings, the numeral 10 indicates generally a grinding attachment which is intended for use on either a bench saw or a radial arm saw. Each of these widely used saws has a work table 14 in which a miter groove 15 is formed to extend parallel to the side edges of the work table and between the front and rear edges thereof. Normally, the saw blade is mounted on a driven arbor (not shown) to rotate while projecting through a slot (also not shown) in the table 14 in the case of a table saw, or a suitable distance above the work table in the case of a radial arm saw.

The attachment 10 comprises a base 20, a guide 21, and a connecting shaft 22. Guide 21 normally is slidably mounted in the table groove 15 so that the shaft 22 just clears the top of the table and is disposed at right angles to said groove, the base 20 then slidably engaging the table top. The collar-like base 20 is split as shown at 24 in FIG. 1 and the two separated parts of the collar are interconnected by a clamping screw 25. This arrangement enables the base 20 to be clamped around the shaft 22 near one end thereof. The guide 21 has an upper portion 26 through which an opposite end of the shaft 22 projects and this portion may be provided with a similar split 27 and clamping screw 28. Thus, the base 20 and guide 21 are connected by the shaft 22 so that they can be moved towards and away from one another as required and furthermore, said base is rotatably mounted about the longitudinal axis of the shaft for adjustment in a number of selected positions.

A plate 30 is mounted above the shaft 22 to support a saw blade 32 during the grinding operation and this plate is secured to the base 20 by mounting means generally indicated at 34. As shown in FIGS. 1 and 2, the means 34 comprises an upstanding bracket 35 which is integrally formed on the base 20. The plate 30 has a depending bracket 36 positioned alongside the bracket 35. An adjusting screw 37 interconnects the two face-to-face brackets 35 and 36 so that the plate 30 can be rocked about the axis of said screw which is parallel to the table groove 15. In FIG. 1, the bracket 35 will be seen to have an index mark 38 which reads against a graduated scale 39 on the bracket 36. This arrangement enables the plate 30 to be tilted as required about a horizontal axis extending at right angles to the longitudinal axis of the shaft 22.

The plate 30 is provided with securing means generally indicated at 42 which serves to rotatably attach a saw blade to the plate 30 for engagement by the grinding wheel. FIGS. 1 and 2 show the means 42 as comprising a shoulder bolt 43 having a head 44 and a reduced and threaded lower end 45 (FIG. 1), a washer 47, and a spring 48 which is interposed between said washer and said head. Plate 30 is provided with a number of threaded holes which are designated as 50 and 51 and 52. These holes 50, 51 and 52 are adapted to receive the threaded lower end of the bolt 43, the holes being spaced apart so that saw blades of varying diameter, i.e., 6, 9 and 12 inches, can be attached to the top of the plate 30. The washer 47 bears against the face of the saw and the spring 48 exerts a resilient clamping pressure thereon when the bolt 43 is suitably tightened. Thus, the blade 32 is firmly secured to the top of the plate 30 although it is possible to rotate the blade about the axis of the bolt 43 if a suitable turning force is applied to the edge of the blade.

Attachment 10 is provided with yieldable stop means generally indicated at 56 which serves to contact the teeth of the saw blade as the blade is rotated on the plate 30 whereby to hold the blade in a selected position. The means 56 is shown to comprise a cylindrical rod 57 which is carried in a sleeve 58 (FIG. 1) formed on the underside of the plate 30 near one end thereof. A flexible stop 58 is secured to one end of the rod 57 preferably by means of a pin 59, this stop preferably being formed on a bendable material which allows it to be curved upwardly from an original straight position shown by dotted lines in FIG. 3 only to a normally assumed position shown by solid lines in FIGS. 1, 2 and 3. Rod 57 is rather tightly gripped by the sleeve 58 so that some resistance is offered to longitudinal and rotational movement of the rod.

In order to sharpen the table saw blade 32 using the grinding attachment 10, the blade is removed from its driven arbor and is replaced by a grinding wheel 60, see FIGS. 1 and 2. The attachment 10 is placed on the table 14 with the base 20 slidably resting on the table top and with the guide 21 slidably received in the miter groove 15.

The blade 32 is then fastened to the plate 30 using the securing means 42 and with the bolt 43 being appropriately positioned in a selected one of the holes 50, 51 or 52 as determined by the diameter of the blade. Bolt 43 is tightened to firmly clamp the blade in place while still allowing it to be rotated. Preferably, the teeth of the saw blade 32 are positioned so that they just overhang the adjacent edge of the plate 30. The rod 57 is now extended as required to allow the upwardly curving stop 58 to enter between two adjacent saw teeth when the blade 30 is rotated. It will be found that the yieldable stop 58 acts as a pawl with the teeth of the saw blade forming a ratchet whereby the saw blade can be turned progressively and normally one tooth at a time.

In the drawings, the blade 32 is shown supported by the apparatus 10 in a horizontal position. This was done for the sake of convenience but, during the sharpening operation now being described, the blade actually is tilted downwardly (FIG. 1) towards the grinding wheel 60 so that the teeth being sharpened engage the edge of the wheel near the top surface of the table 14. This forward tilting of the blade can be achieved by temporarily loosening either of the bolts 25 or 28 so that the plate 30 can be rocked about the longitudinal axis of the shaft 22 to the required angle.

Most saw blades are sharpened with the vertical axis of the bracket 36 perpendicular to the work table 14 as shown best in FIG. 3. However, some teeth are ground not at right angles to the plane of the blade but at a slight angle thereto so as to provide a suitable clearance. To accomplish this type of grinding, the bolt 37 is loosened and the plate 30 is rocked to left or right (FIG. 3) to the required angle indicated by the index mark 38 reading on the scale 39 whereupon said bolt is retightened to maintain the angular setting.

With the grinding wheel 60 rotating, the attachment 10 is moved forward on the table 14 to present a tooth of the blade to the wheel and to remove the required amount of metal which will sharpen that tooth. The attachment is then moved back and the blade is turned about the longitudinal axis of the bolt 43 a distance equal to one tooth. This movement causes the stop 58 to click into the next tooth so as to indicate when the tooth to be sharpened is properly aligned with the grinding wheel 60 and to resist further turning movement of the saw blade on the plate 30. The grinding operation is then repeated to sharpen the saw blade one tooth at a time.

The above described grinding operation is the one used to sharpen a table saw blade but, in the case of a radial arm saw, the procedure is slightly different. The grinding wheel 60, which is then mounted on the movable arbor (not shown) of the radial arm saw, is moved up to the saw blade to sharpen each tooth in turn. The attachment 10 remains stationary and only the grinding wheel 60 is moved back and forth to sharpen the teeth as the saw blade is rotated on the table 30.

From the foregoing, it will be seen that the present attachment can be used to sharpen either a table saw blade or the blade of a radial arm saw with the sharpening being done in each case quickly and easily as well as accurately.

1. A grinding attachment for sharpening a saw blade of a saw having a work table in which a miter groove is formed and a driven arbor for said saw blade, comprising a base mountable on the work table, a guide enterable into the miter groove, a shaft normal to the miter groove and connecting the base and guide in spaced relation, a plate above the base, mounting means securing the plate to the base, and securing means adapted to rotatably attach a saw blade to the plate for engagement by a grinding wheel mounted on the driven arbor.

2. A grinding attachment as claimed in claim 1, and including yieldable stop means carried by the plate progressively to engage each cutting tooth of the saw blade and thereby align another cutting tooth with the grinding wheel.

3. A grinding attachment as claimed in claim 1, in which said base is supported to be rocked about the longitudinal axis of the shaft whereby the plate can be adjusted to a selected inclined position relative to the work table.

4. A grinding attachment as claimed in claim 1, in which said securing means comprises a shoulder bolt enterable into a selected one of a plurality of spaced apart and threaded holes formed in the plate, a washer and a spring mounted on the shoulder bolt and co-operating therewith to exert resilient pressure clamping the saw blade to the plate.

5. A grinding attachment as claimed in claim 2, in which said stop means is adjustably carried by the plate to accommodate saw blades of varying diameters.

6. A grinding attachment as claimed in claim 1, in which said mounting means includes a graduated scale and a co-operating index mark.

7. A grinding attachment for sharpening a saw blde of a saw having a work table in which a miter groove is formed and a driven arbor for temporarily supporting a grinding wheel, comprising a base mountable on the work table, a guide enterable into the miter groove, a shaft normal to the miter groove and connecting the base and guide in spaced relation, said base being adjustable about the longitudinal axis of the shaft, a plate above the base, mounting means securing the plate to the base for rocking movement about an axis perpendicular to the longitudinal axis of the shaft, securing means adapted to rotatably attach a saw blade to the plate for engagement by the grinding wheel, said securing means comprising a shoulder bolt enterable into a selected one of a plurality of spaced apart and threaded holes formed in the plate, a washer and a spring mounted on the shoulder bolt and co-operating therewith to exert resilient pressure clamping the saw blade to the plate, and yieldable stop means carried by the plate progressively to engage each cutting tooth of the saw blade and thereby align another cutting tooth with the grinding wheel.

* * * * *